United States Patent
Prohofsky et al.

(10) Patent No.: US 10,104,158 B2
(45) Date of Patent: Oct. 16, 2018

(54) USER INVISIBLE DEVICE DIAGNOSTIC REGION IN A DISTRIBUTED DATA STORAGE NETWORK

(71) Applicant: Seagate Technology LLC, Cupertino, CA (US)

(72) Inventors: Thomas R. Prohofsky, Edina, MN (US); Sumanth Jannyavula Venkata, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 1253 days.

(21) Appl. No.: 13/944,504

(22) Filed: Jul. 17, 2013

(65) Prior Publication Data

US 2015/0026228 A1    Jan. 22, 2015

(51) Int. Cl.
  *G06F 13/00* (2006.01)
  *H04L 29/08* (2006.01)
  *G06F 3/06* (2006.01)

(52) U.S. Cl.
  CPC ............... *H04L 67/10* (2013.01); *G06F 3/06* (2013.01); *H04L 67/1097* (2013.01)

(58) Field of Classification Search
  CPC ........ G06F 3/0644; G06F 3/06; G06F 3/0665; G06F 3/0689; H04L 67/10; H04L 67/1097
  USPC .............. 709/201, 226, 229, 213–215; 710/5
  See application file for complete search history.

(56) References Cited

U.S. PATENT DOCUMENTS

| | | | |
|---|---|---|---|
| 5,829,045 A | 10/1998 | Motoyama | |
| 6,138,179 A | 10/2000 | Chrabaszcz et al. | |
| 6,480,932 B1 | 11/2002 | Vallis et al. | |
| 6,711,660 B1 * | 3/2004 | Milne | G06F 9/4406 711/173 |
| 8,200,869 B2 | 6/2012 | Haines et al. | |
| 8,234,641 B2 | 7/2012 | Fitzgerald et al. | |
| 8,799,523 B2 * | 8/2014 | Klughart | G06F 3/0607 710/2 |
| 9,009,440 B2 * | 4/2015 | Beadnell | G06F 3/0607 711/173 |
| 9,727,277 B2 * | 8/2017 | Pfeffer | G06F 3/0659 |
| 2009/0125699 A1 * | 5/2009 | Beadnell | G06F 3/0607 711/173 |
| 2013/0073747 A1 * | 3/2013 | Klughart | G06F 3/0607 710/5 |
| 2014/0181433 A1 * | 6/2014 | Pfeffer | G06F 3/0622 711/160 |

FOREIGN PATENT DOCUMENTS

WO    2008054997 A2    5/2008

* cited by examiner

*Primary Examiner* — Kenneth R Coulter
(74) *Attorney, Agent, or Firm* — Hall Estill Attorneys at Law

(57) ABSTRACT

A data storage system may generally have a controller connected to multiple separate data storage devices in a distributed network. Each data storage device may be configured with a user invisible diagnostic region where diagnostic information is stored in logical block addresses (LBA) beyond a storage capacity of the respective data storage devices and the diagnostic information can be accessible via read and write requests to LBA beyond the storage capacity of the respective data storage devices.

20 Claims, 4 Drawing Sheets

USER INVISIBLE DEVICE DIAGNOSTIC REGION IN A DISTRIBUTED DATA STORAGE NETWORK

SUMMARY

A distributed data storage network may generally be capable of storing data from and retrieving data to a variety of local and remote locations.

In accordance with some embodiments, a data storage system has a controller connected to multiple separate data storage devices in a distributed network. Each data storage device may be configured with a user invisible diagnostic region where diagnostic information is stored in logical block addresses (LBA) beyond a storage capacity of the respective data storage devices and the diagnostic information can be accessible via read and write requests to LBA beyond the storage capacity of the respective data storage devices.

DETAILED DESCRIPTION

Figure 1:
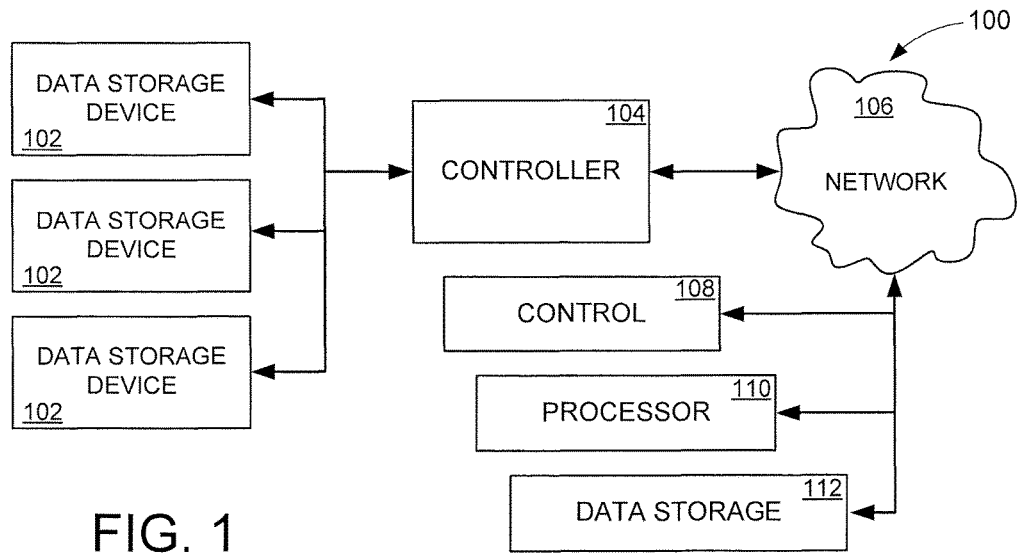
FIG. 1 is a block representation of an example data storage system configured and operated in accordance with some embodiments.

Advancement of data storage systems towards distributed computing environments with multiple data storage device interconnected to provide higher data capacity and greater data throughput has hindered the diagnostic capability of the system. With multiple data storage devices acting in concert, the identification, evaluation, and optimization of individual data storage devices can be difficult due to a centralized control scheme. For example, a distributed network of separate data storage devices can function seamlessly together to provide a singular, large block of data storage that is difficult to parse to distinguish the status and performance of constituent data storage devices. With these issues in mind, providing diagnostic capabilities to individual devices in a distributed data storage network is a continued emphasis of the industry.

Accordingly, a controller can be connected to multiple separate data storage devices in a distributed network with each data storage device configured with a user invisible diagnostic region where diagnostic information is stored in logical block addresses (LBA) beyond a storage capacity of the respective data storage devices and the diagnostic information is accessible via read and write requests to LBA beyond the storage capacity of the respective data storage devices. The ability to partition a device and store diagnostic information in a region invisible to a user allows the device to self-populate the diagnostic information without concern for the information being lost, overwritten, or corrupted by user operation. Moreover, storing the diagnostic information in logical block addresses (LBA) provides the ability to access the diagnostic information from the user invisible region via standard read and write requests instead of command protocol, such as S.M.A.R.T. commands, that can be complex, time consuming, and not compatible across diverse data storage environments.

As a result, a user can access real-time diagnostic information for individual devices in a distributed network via simple, ubiquitous read and write requests that return status and performance diagnostic data on demand. While a distributed data storage network that employs individual device diagnostic capabilities can be utilized in an unlimited variety of data storage systems, FIG. 1 generally illustrates an example data storage system 100 configured and operated in accordance with various embodiments. As shown, a plurality of data storage devices 102 can be interconnected locally and connected to a centralized controller 104. The plurality of devices 102 may be configured as common or uncommon types of devices with uniform or diverse speeds, capacities, and locations. For instance, a 120 GB solid state memory device may be used in conjunction with a 2 TB rotating hard disk drive that is physically located in the same chassis.

Regardless of the number, type, and capacity of the various data storage devices 102, the controller 104 can operate exclusively or with other control components to direct maintenance, data writing, and data retrieval functions in one or more of the plurality of data storage devices 102. In this way, the various data storage devices 102 can complement each other's speed and capacity to provide optimized data storage for a user. Such optimized data storage may further be utilized across a network 106 with appropriate protocol to provide data storage capability to locations anywhere in the world.

The network 106 may also provide additional control 108, processing 110, and storage capacity 112 to the plurality of devices 102 to allow for sophisticated data transmission, storage, and retrieval, such as with high definition video streaming, data downloading, and data intensive processing. The ability to remotely utilize processing 110 and data storage 112 has proliferated distributed network computing, such as cloud and internet computing, where minimal local data storage and processing hardware is provided and connection to a network is utilized to increase mobility of electronic devices.

Figure 2:
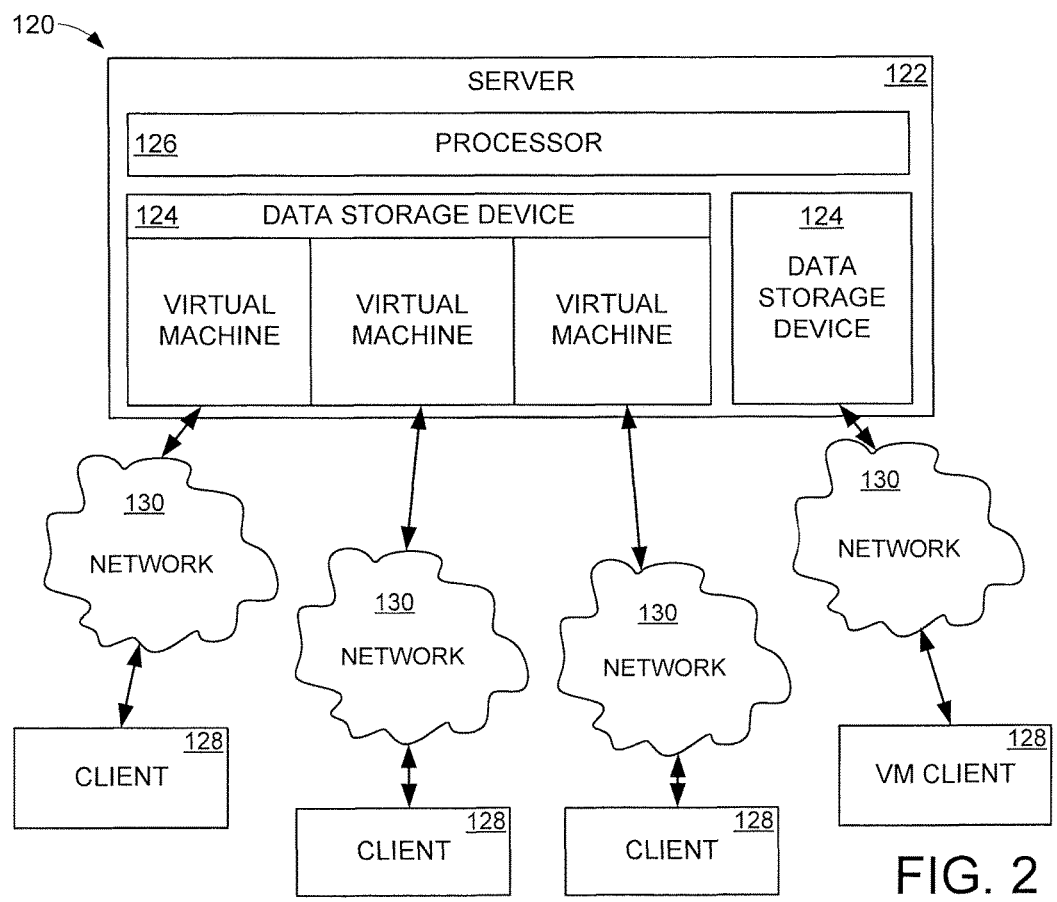
FIG. 2 displays a block representation of an example distributed computing system capable of being used in the data storage system of FIG. 1.

FIG. 2 provides a block representation of a distributed computing system 120 that is configured and operated in accordance with some embodiments to utilize remote data storage and processing like that shown in FIG. 1. The computing system 120 has at least one centralized server 122 that operates as a controller for data storage via several data storage devices 124, processing via a processor 126, and operating control via software executed on the server 122 and distributed to remote clients 128 across one or more networks 130 in what can be characterized as virtual machines. As shown, multiple virtual machines can be present on a single data storage device 124 by partitioning the device 124 into management regions that concurrently execute independent operating systems with at least one processor 126.

With the server 122 capable of running multiple independent virtual machines (VM) on management partitions in the data storage devices 124 to service various clients 128 via a common or plurality of different networks 130, a centralized computing system can provide data storage, processing, and software execution with each client 128 physically possessing the computing hardware. The consolidation of computing hardware in the server 122 further allows for efficient software, security, and equipment maintenance as opposed to if each client 128 contained separate hardware and software components. Being able to remotely access and utilize hardware and software present on the server 122 can be optimized by distributing computing activities among multiple components, such as several processors, temporary cache memory sites, and permanent data storage devices.

Figure 3:
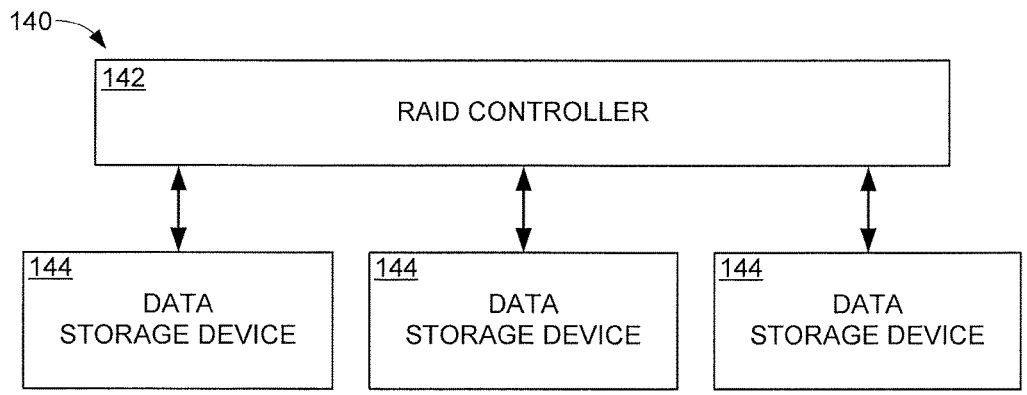
FIG. 3 shows a block representation of a data storage portion of an example distributed data storage network configured in accordance with various embodiments.

FIG. 3 is a block representation of a data storage portion 140 of an example network server capable of being accessed and utilized by multiple different clients. The data storage portion 140 may be configured as a redundant array of independent disks (RAID) by a RAID controller 142, but such construction is not required or limited as multiple data storage devices 144 can be controlled by different controllers both serially and in parallel. In a RAID setup like that shown in FIG. 3, the controller 142 can direct data across multiple data storage devices 144 for redundancy, security, and data reliability based on a number of different RAID schemes, such as level 0-4. However, the consolidation of data storage devices 144 combined with the redundant distribution of data can render individual data storage device 144 evaluation and optimization difficult as the controller 142 treats the plurality of devices 144 as a single block of data storage.

Individual data storage device 144 evaluation can similarly be difficult in the virtual machine environment shown in FIG. 2. That is, a data storage device with various management partitions can correspond with varying status and performance metrics that are difficult to parse to provide real time diagnostic information pertaining to a single partition. With the sophistication of computing hardware and software, user demand for diverse kinds of diagnostic data storage device information for each device that is both accurate and current has be frustrated by controllers supplying information pertaining merely to a group management partitions or the entirety of a data storage devices. Thusly, the ability to identify and optimize real time diagnostic information for individual data storage devices to provide accurate device information is placed at a premium.

Figure 4:
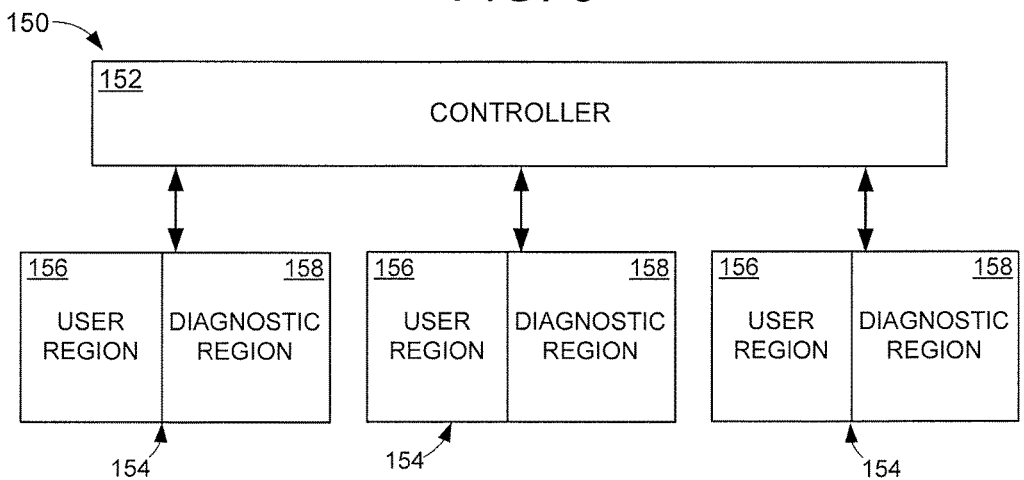
FIG. 4 illustrates a block representation of a portion of example data storage system configured and operated in accordance with some embodiments.

FIG. 4 displays a block representation of a portion of an example data storage system 150 that may be implemented in a distributed data storage network in accordance with some embodiments. The data storage system 150 may comprise any number of components physically located in local or remote positions and interconnected via local wired or wireless networks. At least one controller 152 is connected to a plurality of data storage devices 154 that each has a user region 156 and a diagnostic region 158. Various embodiments configure each region 156 and 158 to connect to the controller 152 via a common interface, such as an Ethernet protocol, while other embodiments utilize independent interfaces for the respective regions 156 and 158.

The partitioning of each data storage device 154 into separate regions 156 and 158 can be enhanced by designating the user region 156 as a certain range of logical block addresses (LBA) that can be viewed, searched, browsed, and altered by a user while the diagnostic region 158 is made invisible to the user. By being "invisible," the diagnostic region 158 cannot be viewed by a user as the LBA assigned to region 158 are treated as beyond the storage capacity of the data storage device 154. In other words, a user's query of the capacity of a data storage device 154 would return the linear capacity of the LBAs assigned to only the user region 156. As such, the diagnostic region 158 of each device 154 is invisible to a user and is present to be utilized by the controller 152 and firmware resident in the device 154 itself.

Through the utilization of the diagnostic region 158 being invisible to a user, diagnostic data present in the region 158 can be protected from inadvertent user operation like overwriting, moving, and corruption. Placing control of the diagnostic region 158 in the hands of device firmware and the controller 152 further ensures adequate space to maintain a variety of different diagnostic information. In some embodiments, the size of the diagnostic region 158 is changed by device firmware or the controller 152 automatically in response to a certain percentage, such as 75%, of available LBAs being occupied by diagnostic data. The partitioning of each device 154 into user 156 and diagnostic 158 regions can allow full data storage function while maintaining device 154 specific diagnostic information regarding status and performance of data storage operations to the user region 156, which contrasts a centralized data storage environment, line those shown in FIGS. 2 and 3, that treat multiple data storage devices or management partitions as collective blocks of storage.

Figure 5:
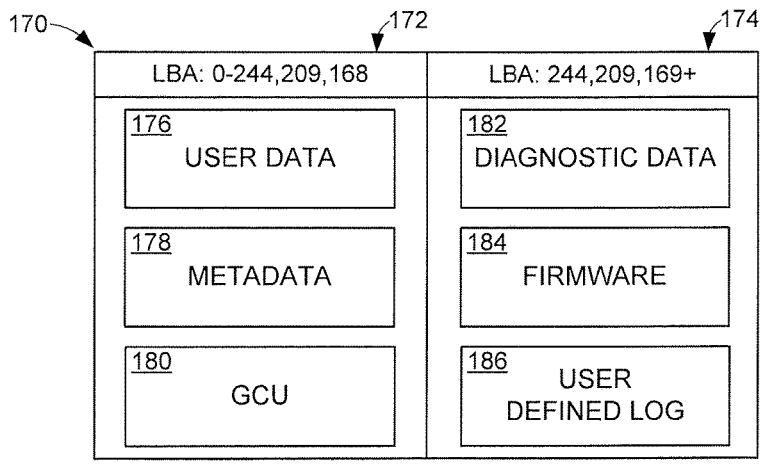
FIG. 5 provides a block representation of a portion of an example data storage device configured and operated in accordance with various embodiments.

FIG. 5 illustrates a block representation of an example data storage device 170 that is configured with a user region 172 with LBAs from 0 to 244,209,168 and a user invisible diagnostic region 174 with LBA from 244,209,169 onward. The designation of both user 172 and diagnostic 174 regions with specific LBAs can allow for efficient data organization, programming, and retrieval as specific addresses can be referenced for specific data, which can provide time and processing savings, especially in operating systems where numerous user data 176 and metadata 178 updates are conducted along with stale data removal with garbage collection units (GCU) 180. In some embodiments, the user region 172 is partitioned into several sub-regions that may conduct various operations like the execution of a virtual machine.

The designation of particular user invisible data like the diagnostic data 182 and firmware 184 can complement other user defined, but also invisible, data like the log 186 shown in FIG. 5. That is, the diagnostic region 174 may be invisible for user viewing, but may allow user manipulation via user defined diagnostic criteria, such as bit error rate and voltage, and the firmware 184 creating the criteria in the particular LBA of the diagnostic region 174. Hence, the diagnostic region 174 can be controlled by system firmware 184 that selectively allows user access and manipulation of data while restricting user capabilities and operations in the user region 172 from extending to the diagnostic region 174.

As a non-limiting example, a user can designate the logging of particular diagnostic criteria, like device temperature, and the firmware 184 will expand the diagnostic region 174 to create and populate the log 186 with real time, device specific information without allowing the user privilege to see, search, or move any portion of the diagnostic region 174. This firmware controlled structure allows the diagnostic region 174 to be operated as efficiently as possible as the firmware 184 does not have to refresh, update, and monitor potential user activities in the region 174. The lack of user intervention may further allow the diagnostic region 174 to be organized as a simple table, such as a FAT32 or FAT64, without concern that user activities will corrupt the organization or underlying data.

While the firmware 184 and logical block addressing of data in the diagnostic region 174 can prevent a user from seeing or modifying the contents of the region 174, the user can be allowed access to various diagnostic information stored in the region 174 via read and write requests. That is, a user can receive diagnostic data present in the diagnostic region 174 by commanding a read or write request to LBAs beyond the capacity of the user region 172, which would be greater than LBA 244,209,168 in the example embodiment of FIG. 5. Instead of returning an error for trying to read or write data to an LBA greater than the capacity of the user region 172, the firmware 184 can intercept and interpret the user request to provide predetermined diagnostic data from the diagnostic region 174.

With the diagnostic region 174 and firmware 184 capable of storing and updating a wide variety of device 170 performance and status diagnostic information, such as bit error rate, voltage, mode of operation, humidity, ECC accuracy, command queue failures, and date stamps, a user may be provided all diagnostic data upon a read request to any LBA beyond the max LBA and capacity of the user region 172. Alternatively, a user's read request to a diagnostic region 174 LBA may return specific diagnostic information as designated by the user. For example, a user could choose to read any LBA above 244,209,168 an all diagnostic data 182 could be outputted or a single diagnostic criteria could be outputted upon query of the user by the operating system and firmware 184.

The ability to return some or all of the diagnostic data 182 upon a read request may be complemented by storage and retrieval of data 182 in formats easily read by many computing systems, such as .html and .xlm formats. As for data write requests, a user can generally designate the storage of diagnostic criteria, such as bit error rate, and streaming of data to the diagnostic region 174 that is interpreted by the firmware 184 and subsequently translated into data being written on LBA(s) in the diagnostic region 174. This adherence to user requests filtered by the firmware 184 allows the diagnostic region 174 to uphold integrity and remain invisible to the user while providing real time diagnostic data to the user on demand.

A non-limiting embodiment may configure the firmware 184 to be present in the user region 172 of a factory fresh, blank data storage device and capable of automatically detecting partition table updates made by a host to create the diagnostic region 174. In the event a file system or kernel has code preventing block level access beyond a set capacity, the firmware 184 may change the max LBA limit to allow for the diagnostic region 174, which would then be made invisible to the user by resetting the max LBA to a lower value to set the device capacity. Various embodiments of the firmware 184 allow for the creation and removal of diagnostic regions 174 so that a device can adapt to varying conditions, such as increased diagnostic data accuracy via redundant data storage.

Figure 6:
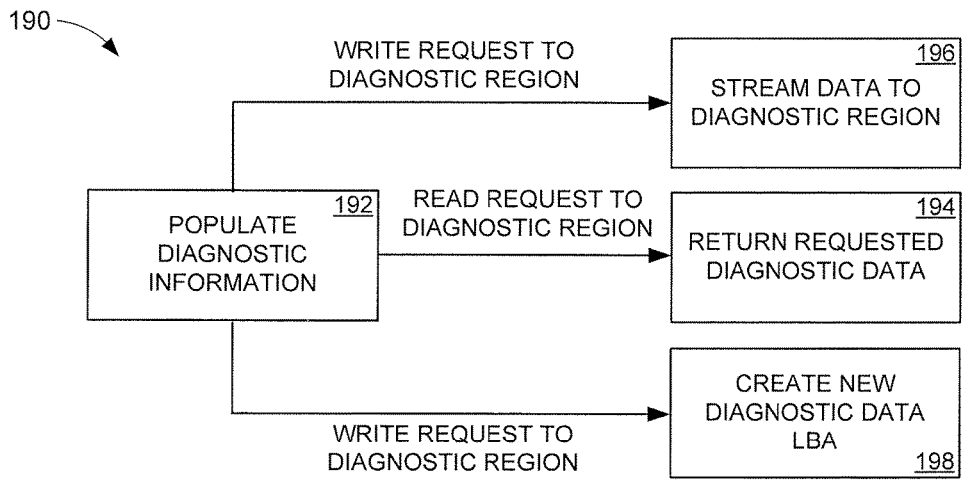
FIG. 6 maps example logic performed in some embodiments.

FIG. 6 shows example firmware logic 190 that is conducted in some embodiments within each data storage device of a distributed data storage network. The logic 190 may begin in an unlimited number of steps, but is displayed in FIG. 6 as starting with step 192 where diagnostic criteria is populated automatically and independently without user initiation. Step 192 may populate one or more different diagnostic device status and performance criteria continually or sporadically over time so that step 192 is always being executed. With at least one diagnostic criteria populated by step 192, the diagnostic information can be available to be retrieved in step 194 in response to a read request to an LBA of the diagnostic region. The read request can be specific or general, as dictated by the user and interpreted by firmware, so that one, several, or all the populated diagnostic information is provided to the user once an LBA beyond the storage capacity of the user region is entered.

For clarity, a non-limiting example of step 194 may have a user submitting a read request to an LBA of 250,000,000 when the max LBA and capacity of the user region of the device is 200,000,000, which would correspond with the diagnostic data at least from LBA 250,000,000 being retrieved to the user. The operating system of a computing system may be configured to allow a user to visually select one or more diagnostic criteria to be returned, which would be translated to specific diagnostic region LBA beyond the 200,000,000 capacity by firmware.

In the event a write request is submitted by the user to an LBA beyond the max LBA of the user region, step 196 may immediately create or clear diagnostic criteria and populate such criteria over a designated amount of time by streaming data, such as a test pattern, to the user region of the device. Such streaming of data may provide a user with a snapshot of device performance when a diagnostic criteria has not been populated or is populated with stale data. A write request to an LBA greater than a max LBA for a device can also proceed to step 198 where a new diagnostic criteria is created and subsequently populated. Step 198 may be performed with a user wanting specific diagnostic data that has either gone stale or has not been previously recorded. As such, step 198 may create a new version of existing diagnostic criteria that will subsequently be rectified with the older version during low system processing times.

The ability to provide access to diagnostic information stored in a user invisible region of a storage device allows a user to query drive specific information without having to install protocols, tools, or software. The diagnostic information can be selectively provided to the user and return real time diagnostic information in a human readable context. Such diagnostic information storage and retrieval can allow data traffic and storage device usage statistics to be presented on demand, which can allow user or firmware optimization of device operation conducive to changing criteria. By providing control of the diagnostic region and data to firmware, simple firmware updates can dictate changes to the management of the diagnostic region, such as size, content, and existence.

Figure 7A:
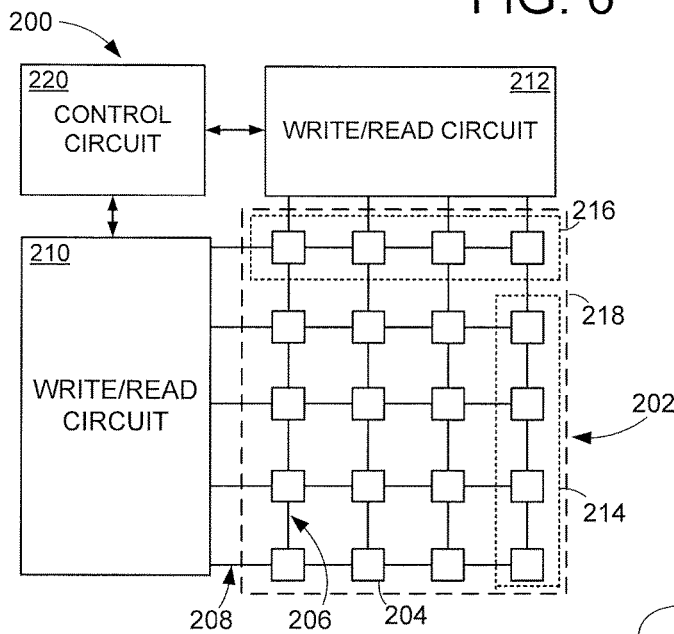
FIGS. 7A and 7B respectively illustrate example types of data storage devices constructed and operated in accordance with various embodiments.
Figure 7B:
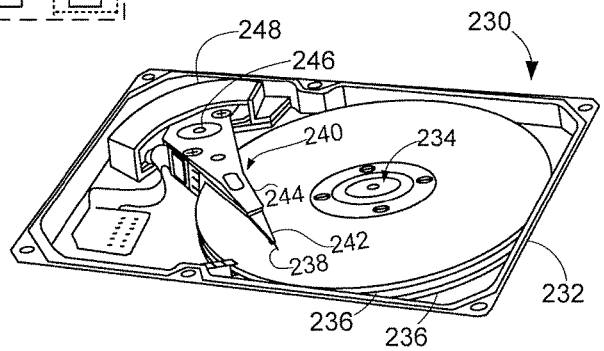

While the ubiquitous use of a data storage device has been used thus far, the present disclosure is not limited to a particular type, size, or speed of data storage device. FIGS. 7A and 7B respectively illustrate different types of data storage devices that may be used exclusively or concurrently in a distributed data storage network. In FIG. 7A, a block representation of a portion of an example solid state data storage device 200 is displayed as constructed and operated in accordance with some embodiments.

The solid state data storage device 200 may be constructed as one or a multitude of separate die and chips that operate together to store data without any rotating components. The portion of the device 200 illustrated in FIG. 7A provides an example data array 202 along with various data programming, evaluation, and reading circuitry that can be a part or the entirety of a data storage device. The data array 202, as shown, can have a number of non-volatile memory cells 204 arranged in rows and columns that correspond with the overlapping of electrical paths 206 and 208, such as bit and source lines, in an orientation that can be characterized as a cross-point array. One or more write/read circuits 210 and 212 can individually or concurrently control data being written to and read from selected memory cells 204 arranged in sectors 214, pages 216, blocks 218, and garbage collection units. Such control may be conducted with respect to multiple cells, such as an entire row, page, and block, singularly or successively to expedite data accesses.

One or more control circuits 220 may provide row and column testing and operation capabilities that are monitored, recorded, and evaluated continually or periodically. As such, the control circuit 220 may direct operation of the write/read 210 and 212 circuits to determine what and how memory cells 204 are operating. Various embodiments further can continually and periodically conduct tests and evaluations of the operating characteristics of various memory cells 204 to identify the type and function of data being stored in the memory array 202, which can allow the characterization of data with respect to host operating systems, network protocol, and security procedures. In a non-limiting example, data in a diagnostic region of the memory array 202 can be encrypted and organized in security bands with Trusted Computing Group encryption or with a simple passphrase submitted as a write request.

FIG. 7B shows a hard disk drive data storage device 230 that has substantially sealed housing formed from a base deck 232 and top cover. An internally disposed spindle motor 234 is configured to rotate a number of magnetic storage media 236. The media 236 are accessed by a corresponding array of data transducers (read/write heads) that are each supported by a head gimbal assembly (HGA) 238. Each HGA 238 can be supported by a head-stack assembly 240 ("actuator") that includes a flexible suspension 242, which in turn is supported by a rigid actuator arm 244. The actuator 244 may pivot about a cartridge bearing assembly 246 through application of current to a voice coil motor (VCM) 248. In this way, controlled operation of the VCM 248 causes the transducers to align with tracks (not shown) defined on the media surfaces to store data thereto or retrieve data therefrom.

The rotating data storage device 230 may be used individually and in conjunction with a solid state array, like the array 202 of FIG. 7A, in accordance with various embodiments as part of a hybrid data storage device. Such a hybrid device may selectively utilize the various aspects of the solid state and rotating data storage environments to optimize data throughput and reliability. For example, the solid state device 200 may store long-term data while the rotating data storage device 230 stores data that is often rewritten and updated to reduce the wear and resistance variation that can occur in solid state memory cells after repeated write/erase cycles.

Figure 8:
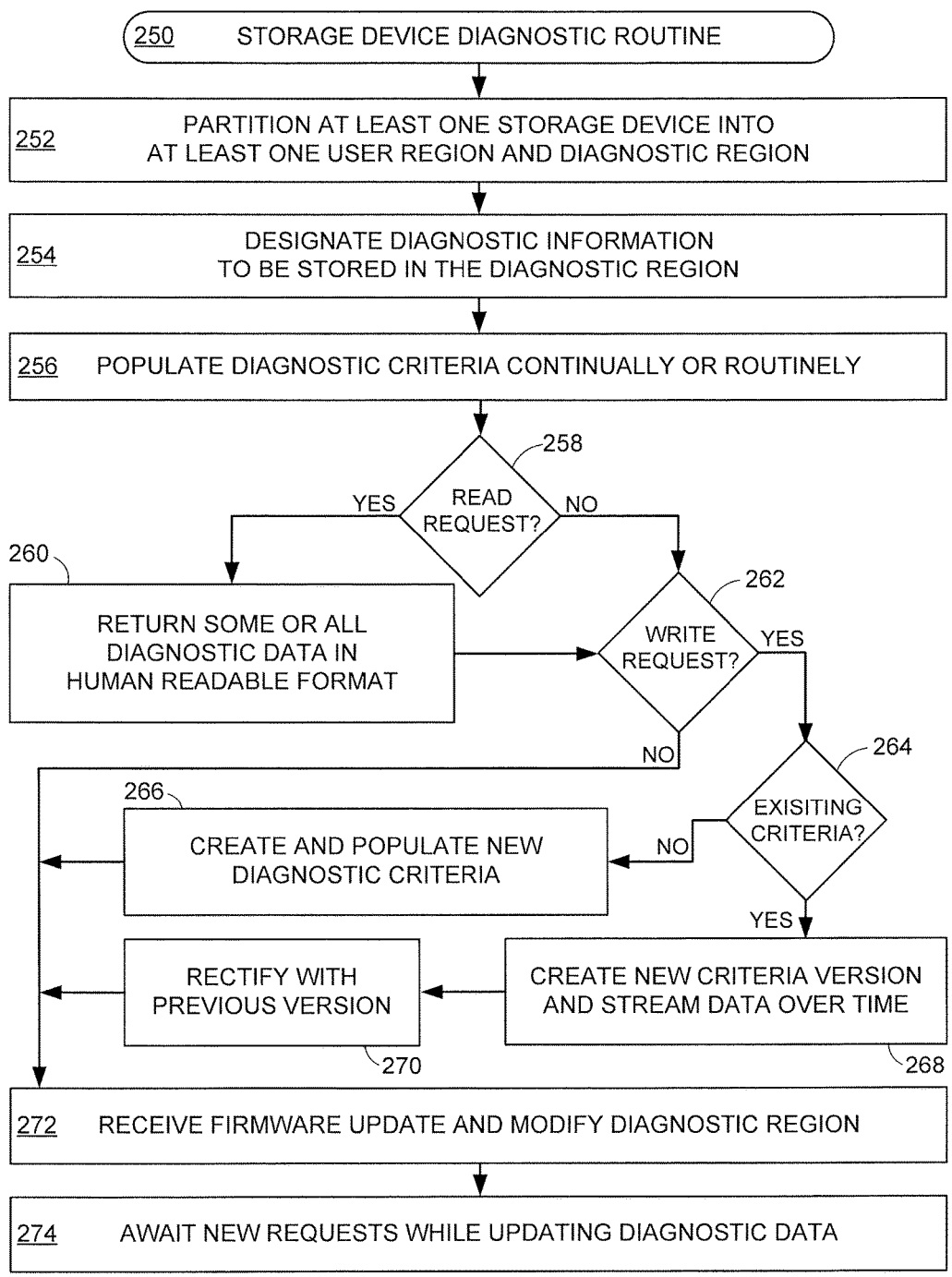
FIG. 8 provides a flowchart of an example storage device diagnostic routine carried out in accordance with various embodiments.

Regardless of the common or uncommon type of data storage devices used in a distributed network, the storage and population of drive specific diagnostic data in a user invisible region allows real time device data to be provided to a user on demand. FIG. 8 maps an example storage device diagnostic routine 250 carried out in accordance with various embodiments. The routine 250 begins by partitioning at least one data storage device to have at least one user region and diagnostic region in step 252. The partitioning of step 252 may be conducted initially when a device is blank and free of user data or after user data has already been programmed to the device. The partitioning of step 252 may be carried out locally by firmware or remotely by a controller connected to the device via a network to allow user visibility to the user region and restriction of user visibility to the diagnostic region, which may allow content of the diagnostic region to be based on a license key that may be purchased for one or more different devices.

Step 254 proceeds to designate at least one diagnostic criterion to be monitored in the user invisible diagnostic region of each device. Such designation may include one or more different device status and performance criteria that can be immediately or routinely populated by step 256. The population of the designated criteria are stored in predetermined LBA of the diagnostic region and hidden from view by a user until a request is made either by the user or another host, such as a remote controller. Decision 258 evaluates if a read request has been made while continuing to execute step 256 to populate previously designated diagnostic criteria. If a read request is pending, decision 256 advances routine 250 to step 260 where some or all of the populated diagnostic data present in the diagnostic region is returned to a user in human readable format, such as .html.

With no read request pending, decision 262 queries if a write request is pending. In the event a write request has been made, decision 264 proceeds to determine if the diagnostic data to be written previously exists in the diagnostic region. Step 266 creates and populates a new diagnostic data point, such as device temperature, bit error rate, and command queue failures, in the user invisible diagnostic region of the device. A lack of the requested diagnostic information from decision 264 then creates a new data point in at least one LBA of the diagnostic region in step 268. The new data point can be populated by streaming data to the diagnostic and user regions over a predetermined amount of time. The creation of new data for an existing data point is next rectified against the prior version in step 270.

While routine 250 may continuously loop between decisions 258 and 262 to service read and write requests, the conclusion of steps 266 and 270 or if no read or write request is pending can receive a firmware update in step 272 that is executed to modify the management and potentially the structure of the diagnostic region of the device. That is, step 272 may correspond with changes to the manner in which firmware manages the diagnostic region as well as the size, presence, and assigned LBAs of the diagnostic region. Execution of step 272 then loops routine 250 back to decision 258 to await new read and write requests while continuing to update existing diagnostic data in step 274.

It should be noted that the various steps and decisions of routine 250 are not required or limited. As such, any steps and decisions can be added, modified, and removed at will. For example, step 256 can be moved or carried out multiple times, in some embodiments, to be executed subsequent to each pending read and write request. In another example, a pending write or read request may trigger a new step where a user is polled by firmware to designate what type of diagnostic data is requested.

Through the assorted embodiments described herein, a data storage device can be partitioned into a user controlled user region and firmware controlled diagnostic region that is invisible to the user. Storage of device specific status and performance diagnostic information that is accessible via user read and write requests allows for the supply of diagnostic data to optimize device operation without jeopardizing the diagnostic data with user activity. Moreover, the utilization of diagnostic data in each data storage device of a distributed network can provide individual device diagnostic information that is convoluted in systems where multiple data storage devices are treated as a single block of data storage, such as RAID and virtual machine environments.

It will be appreciated that the technology described above can readily be utilized in any number of applications, including solid state memory. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a hardware controller connected to multiple separate data storage devices in a distributed network, each data storage device configured with a user invisible diagnostic region where first and second diagnostic criteria are stored in logical block addresses (LBA) beyond a storage capacity of the respective data storage devices, the first and second diagnostic criteria being different and respectively accessible via read and write requests to LBA beyond the storage capacity of the respective data storage devices to provide diagnostic information of a single data storage device of the multiple separate data storage devices to a user.

2. The apparatus of claim 1, wherein the diagnostic region is organized as a file system having a FAT32 configuration.

3. The apparatus of claim 1, wherein at least one data storage device of the distributed network comprises a rotating hard disk drive.

4. The apparatus of claim 1, wherein at least one data storage device of the distributed network comprises a solid state memory array.

5. The apparatus of claim 1, wherein at least one data storage device of the distributed network comprises hybrid device with both rotating and solid state memory data storage.

6. The apparatus of claim 1, wherein a max LBA of each data storage device corresponds with the storage capacity of the data storage device.

7. The apparatus of claim 6, wherein the max LBA is a constant integer and the diagnostic region has LBA above the constant integer.

8. A data storage computing system comprising a hardware controller connected to multiple separate data storage devices in a distributed network, a data storage device has a user region where user data is stored in logical block addresses (LBA) from LBA 0-X with X being less than a storage capacity of the data storage device and a user invisible diagnostic region where diagnostic information for a first diagnostic criteria is stored in LBA Z with Z beyond the storage capacity of the data storage device, diagnostic information for a second diagnostic criteria populated in response to a write request to LBA Y with Y being beyond the storage capacity of the respective data storage devices, the first diagnostic criteria retrieved from LBA Z by the controller in response to a user request to any LBA of the user invisible diagnostic region.

9. The data storage system of claim 8, wherein the hardware controller is a RAID controller and each data storage device is set to a predetermined RAID scheme.

10. The data storage system of claim 8, wherein the user region is partitioned into multiple independent sub-regions.

11. The data storage system of claim 10, wherein at least one independent sub-region executes a virtual machine.

12. A method comprising:
   connecting a hardware controller to multiple separate data storage devices in a distributed network;
   configuring each data storage device with a user invisible diagnostic region;
   populating the user invisible diagnostic region of a data storage device of the multiple separate data storage devices with diagnostic information comprising a first diagnostic criteria and a second diagnostic criteria in response to a write request to any logical block address (LBA) beyond a storage capacity of the data storage device; and
   accessing the diagnostic information via read requests to any LBA beyond the storage capacity of the respective data storage devices.

13. The method of claim 12, wherein the first and second diagnostic criteria of the diagnostic information are each different parameters of device operation for the data storage device where the diagnostic region is located.

14. The method of claim 13, wherein the parameter of device operation comprises bit error rate specifically for the data storage device where the diagnostic region is located.

15. The method of claim 13, wherein the parameter of device operation comprises temperature specifically for the data storage device where the diagnostic region is located.

16. The method of claim 12, wherein the diagnostic information is error logs specifically for the data storage device where the diagnostic region is located.

17. The method of claim 12, wherein the diagnostic information is automatically populated by firmware without user initiation.

18. The method of claim 12, wherein a user read request to an LBA in the diagnostic region returns all the diagnostic information contained in the diagnostic region.

19. The method of claim 12, wherein the diagnostic information is returned to a host in response to the read and write requests in a human readable context.

20. The method of claim 19, wherein the human readable context comprises an .html format.

* * * * *